United States Patent
Koch et al.

(10) Patent No.: US 11,309,591 B2
(45) Date of Patent: Apr. 19, 2022

(54) METHOD AND DEVICE FOR ESTIMATING A STATE OF AN ENERGY STORAGE SYSTEM OF A VEHICLE

(71) Applicants: Clarios Germany GmbH & Co. KGAA, Hannover (DE); ROBERT BOSCH GMBH, Stuttgart (DE)

(72) Inventors: Ingo Koch, Hameln (DE); Eberhard Meissner, Wunstorf (DE); Peter Ostertag, Stuttgart (DE)

(73) Assignees: Ciarlos Germany GmbH & Co. KG, Hannover (DE); Robert Bosch GmbH, Hannover (DE)

( * ) Notice: Subject to any disclaimer, the term of this patent is extended or adjusted under 35 U.S.C. 154(b) by 166 days.

(21) Appl. No.: 16/093,952

(22) PCT Filed: Apr. 7, 2017

(86) PCT No.: PCT/EP2017/058385
§ 371 (c)(1),
(2) Date: Oct. 15, 2018

(87) PCT Pub. No.: WO2017/178365
PCT Pub. Date: Oct. 19, 2017

(65) Prior Publication Data
US 2019/0140323 A1    May 9, 2019

(30) Foreign Application Priority Data

Apr. 15, 2016    (DE) .......................... 102016107038.6

(51) Int. Cl.
*H01M 10/42*    (2006.01)
*B60L 3/12*    (2006.01)
(Continued)

(52) U.S. Cl.
CPC .......... *H01M 10/4285* (2013.01); *B60L 1/00* (2013.01); *B60L 1/14* (2013.01); *B60L 3/12* (2013.01);
(Continued)

(58) Field of Classification Search
CPC ..... H01M 10/42; H01M 10/4285; B60L 1/14; B60L 3/12; B60L 58/16
See application file for complete search history.

(56) References Cited

U.S. PATENT DOCUMENTS

2013/0026824 A1    1/2013  Yoon
2013/0085696 A1*   4/2013  Xu .......................... G06F 17/40
                                                702/63
(Continued)

FOREIGN PATENT DOCUMENTS

CN    102005810 A    4/2011
CN    102893448 A    11/2011
(Continued)

OTHER PUBLICATIONS

International Search Report and Written Opinion for PCT/EP2017/058385 dated Jun. 26, 2017. 6 pages.

*Primary Examiner* — Karie O'Neill Apicella
(74) *Attorney, Agent, or Firm* — Boardman & Clark LLP (57) ABSTRACT

A method of estimating a state of an energy storage system of a vehicle, in particular for estimating an aging state of the energy storage system, includes the following steps: acquiring information about the energy storage system; analyzing the acquired information while taking into account specified boundary conditions; and estimating the state of the energy storage system.

14 Claims, 2 Drawing Sheets

(51) Int. Cl.
*B60L 58/16* (2019.01)
*B60L 1/14* (2006.01)
*B60L 1/00* (2006.01)

(52) U.S. Cl.
CPC ............ *B60L 58/16* (2019.02); *H01M 10/42* (2013.01); *B60L 2240/80* (2013.01); *B60L 2250/16* (2013.01); *B60L 2260/44* (2013.01); *H01M 2220/20* (2013.01); *Y02T 10/70* (2013.01)

(56) References Cited

U.S. PATENT DOCUMENTS

| | | |
|---|---|---|
| 2014/0266227 A1 | 9/2014 | Harman |
| 2016/0078690 A1* | 3/2016 | Lennevi .................... B60L 7/26 701/33.6 |

FOREIGN PATENT DOCUMENTS

| | | |
|---|---|---|
| CN | 102837620 A | 12/2012 |
| CN | 103389468 A | 11/2013 |
| CN | 105102998 A | 9/2014 |
| CN | 105122029 A | 10/2014 |
| CN | 104691541 A | 6/2015 |
| DE | 19540827 | 5/1996 |
| DE | 10335928 | 3/2005 |
| DE | 10 2006 000 397 A1 | 2/2007 |
| DE | 10 2013 213 267 A1 | 1/2015 |
| DE | 10 2013 217 451 A1 | 3/2015 |
| EP | 1 450 173 A2 | 8/2004 |
| EP | 2571093 | 3/2013 |
| JP | 2014054083 | 3/2014 |
| WO | 2011/160258 A1 | 12/2011 |
| WO | 2015/185802 A1 | 12/2015 |

\* cited by examiner

METHOD AND DEVICE FOR ESTIMATING A STATE OF AN ENERGY STORAGE SYSTEM OF A VEHICLE

BACKGROUND

The present invention concerns a method for estimating a state of an energy storage system of a vehicle, in particular for estimating an aging state of the energy storage system. Furthermore, the present invention concerns a device for carrying out the method.

Determining the state of an energy storage system of a vehicle is becoming increasingly important with increasing vehicle functions requiring electrical energy at least for assistance. As safety-relevant functions of the vehicle are increasingly receiving electrical support, the reliability of determination of the state and estimation of the state of the energy storage system is ever more important.

Known systems and methods for determining the state of a battery rely on direct measurement values of the state of the battery and/or the properties of the battery by means of which the state of the battery is determined.

Thus for example, a method for determining the state of a battery is disclosed in DE 195 40 827 C2, with which battery-specific characteristic fields of the battery aging are used to determine a battery aging value from acquired instantaneous values of the battery aging influencing variables using the characteristic field.

Also for example, a method for determining a parameter related to the state of charge of a storage battery is known from DE 103 35 928 A1, with which a first state of charge value related to the quiescent voltage of the battery and a second state of charge value related to the converted charge quantity are determined. The two state of charge values are analyzed regarding the change in the state of charge thereof in order to derive a parameter for the state of the battery from the changes in the state of charge.

Said known systems have the disadvantage that larger errors in the measurement variables directly influence the output variable, and therefore determining the state of the battery system is not unequivocal or can be corrupted. Furthermore, the result of determining the state of the energy storage system can be made inaccurate by the selection of the point in time in the measurement; namely for example by carrying out a plurality of successive measurements at a point in time when the battery is in a similarly discharged state. Thus, an advanced aging state can be erroneously associated with the battery, or the state thereof can be incorrectly determined, so that a battery can be prematurely replaced.

A further disadvantage of the known systems is due to the increased complexity, which is caused by the additionally necessary sensors. Likewise, the need for memory space for the additional data records and for further elements for data storage also increases with each additional sensor, so that the number of components required and the power thereof increases. The increased power of the individual components also results in higher costs.

It is therefore the object of this invention to specify an improved method for estimating the state of an energy storage system that does not have the disadvantages of the prior art, and moreover that is efficient and reliable.

SUMMARY

The object on which the invention is based is achieved according to the invention by the subject matter of independent claim 1. Regarding the device, the object on which the invention is based is achieved by the subject matter of independent claim 20. Advantageous developments are specified in the dependent claims.

Therefore, according to the invention in particular a method is provided for estimating the state of an energy storage system of a vehicle, in particular for estimating an aging state of an energy storage system, which does not rely on directly measured values of the energy storage system for estimating the state but can estimate the state using the behavior of the vehicle.

The aging state of the energy storage system corresponds in this context to a change of any state of the energy storage system relating to the corresponding new state of the energy storage system.

In this case, in a first step information about the energy storage system is acquired. Then the acquired information is analyzed while taking into account specified boundary conditions. Finally, the state of the energy storage system is estimated.

In this context, the boundary conditions are in particular related to an operating time of the vehicle, preferably corresponding to the boundary conditions setpoint values or reference values, which are related to the operating time of the vehicle. Said values are therefore not related to a point in time at which the analysis of the recorded information is carried out.

The advantages of the invention are apparent from the present disclosure. Using the method according to the invention, the state of the energy storage system is estimated using a comparison of the acquired information about the energy storage system with specified boundary conditions. As a result, the number of components is kept small, because no measuring devices have to be provided that acquire the direct battery values, such as for example battery voltage and battery charge.

Also as a result, the aforementioned disadvantages relating to direct measurement of the battery data are avoided. As a further advantage, the risk of an erroneous estimate of the state of the battery is reduced. Likewise, different batteries of different manufacturers can be used, and the state can be estimated regardless of the energy storage system using the same method without design changes having to be made. This also reduces production costs, because no specific changes have to be introduced for different energy storage systems. The estimate of the state of the energy storage system is determined advantageously in this way using the information about the energy storage system, and not by means of directly measured battery values.

According to a further aspect of the invention, the method can also preferably comprise a further step: namely acquiring information about discharge processes of the energy storage system.

This has the advantage that the accuracy of the estimation of the state of the energy storage system can be improved, because information about discharge processes can be taken into account for estimating the state, and thus information about what could be taken from the energy storage system for charging.

According to a further aspect of the invention, the method can preferably comprise a further step: namely acquiring information about charging processes of the energy storage syst.

This has the advantage that the accuracy of the estimation of the state of the energy storage system can be improved, because additionally information about the charging processes can be taken into account, and thus what can be fed to the energy storage system for charging.

According to a further aspect of the invention, the estimation of the state of the energy storage system can be carried out based on the acquired information about the energy storage system and/or based on the acquired information about the discharge processes of the energy storage system and/or based on the acquired information about the charging processes of the energy storage system, without taking into account directly measured values of the energy storage system.

As a result, it is clear that the estimation of the state of the energy storage system is based on the information about the energy storage system and/or on the information about the discharge processes and/or on the information about the charging processes without directly measured values of the energy storage system being taken into account. This reduces the number of components in the vehicle and thus lowers manufacturing and assembly costs, because no further measuring units have to be provided.

According to a further aspect of the invention, vehicle function data are recorded for detecting the information about the energy storage system and/or for detecting information about the discharge processes and/or for detecting information about the charging processes.

This results inter alia in the advantage that vehicle function data are data that are often recorded and stored as standard during vehicle operation. As a result, memory space is saved, because no further battery data sets have to be recorded. Moreover, there are no additional costs for the production and assembly of the data storage elements and for the data storage elements themselves.

According to a further aspect of the invention, output information can be generated based on the vehicle function data and then provided, preferably in the form of a data record, a graphical representation and/or a graphical user interface.

This has the advantage that the output information is seen rapidly by relevant persons, for example the vehicle owner, workshop staff, customer services and/or the manufacturer of the energy storage system or of the vehicle. This promotes rapid action where necessary, which in turn increases the reliability of vehicle usage and reduces the process costs through simple working processes.

According to a further aspect of the invention, the output information can comprise an estimate of the state of the energy storage system. This has the advantage that responsible persons, such as for example the vehicle owner, workshop staff, customer services and/or the manufacturer of the energy storage system or of the vehicle, can be informed about the current state of the energy storage system are and can initiate necessary steps as necessary. This reduces the costs through simple working processes.

According to a further aspect of the invention, a functional change, in particular an occurrence, an absence or a functional restriction, of at least one vehicle function can be concluded from the vehicle function data or a functional change, in particular an occurrence, an absence or a functional restriction, of at least one vehicle function is able to be concluded from the vehicle function data.

In this case, the state of the energy storage system is estimated from the functional change, in particular an occurrence, an absence or a functional restriction of the vehicle function, which advantageously minimizes measurement errors.

According to a further aspect of the invention, a frequency of a functional change, in particular of an occurrence, an absence or a functional restriction of at least one vehicle function during a specified or specifiable period of time can be concluded from the vehicle function data, or a frequency of a functional change, in particular an occurrence, an absence or a functional restriction of at least one vehicle function during a specified or specifiable period of time is able to be concluded from the vehicle function data.

This has the advantage that by taking the frequency into account, the reliability and accuracy of the estimate is further increased because how often a vehicle function occurs, occurs in a restricted manner or is absent during a specified or specifiable period of time is taken into account.

According to a further aspect of the invention, the period of time required for a functional change of at least one vehicle function can be concluded from the vehicle function data, or the period of time required for a functional change of at least one vehicle function is able to be concluded from the vehicle function data, wherein the functional change comprises in particular an occurrence, an absence or a functional restriction.

In this case, advantageously the period of time that the vehicle requires for a functional change of a vehicle function, in particular for a functional change of an energy-intensive vehicle function, is taken into account, which enables the estimation of the state of the energy storage system to be carried out more accurately and more reliably.

According to a further aspect of the invention, a reason for a functional change, in particular an occurrence, an absence or a functional restriction, of at least one vehicle function can be concluded from the vehicle function data, or a reason for a functional change, in particular an occurrence, an absence or a functional restriction, of at least one vehicle function is able to be concluded from the vehicle function data.

This has the advantage that a reason for the functional change of the vehicle function has already been found. This advantageously increases the reliability of the estimation of the state of the energy storage system.

According to a further aspect of the invention, the vehicle function data can comprise data concerning fulfilment/non-fulfilment of at least one vehicle function, in particular data concerning switching off and/or switching on, in particular switching back on, a combustion engine of the vehicle in a start-stop mode of the combustion engine.

Especially during switching on, or switching back on, of the combustion engine, the load on the energy storage system is very high, because only the power of the energy storage system is available for starting the combustion engine. Therefore, the state of the energy storage system can be reliably estimated by this means.

According to a further aspect of the invention, the vehicle function data can comprise data concerning the fulfilment/non-fulfilment of at least one vehicle function, in particular data concerning the operation of at least one functional component or safety component, in particular data concerning the operation of a radiator for a combustion engine of the vehicle, internal illumination, external illumination, power steering, power braking, a gearbox, a clutch, preferably an electrical clutch, technical driving safety control systems and/or ride stability control systems, and/or driving dynamics management systems.

The at least one functional component or safety component comprises electrical loads, using which the state of the energy storage system can also be advantageously reliably determined.

According to a further aspect of the invention, the vehicle function data comprise data concerning the fulfilment/non-fulfilment of at least one vehicle function, in particular data concerning the operation of at least one comfort component, in particular data concerning the operation of an air conditioning system, heating, in particular seat heating, an audio/video entertainment system and/or a navigation system.

The at least one comfort component also comprises electrical loads, using which advantageously the state of the energy storage system can be reliably determined.

According to a further aspect of the invention, the specified boundary conditions can comprise vehicle function data and/or example vehicle function data that are predetermined or can be predetermined.

Vehicle function data that are or can be predetermined can be vehicle function data that can be achieved within an operating time of the vehicle in this context. So Such specified or specifiable vehicle data can moreover be vehicle function data that can be achieved within an operating time of a vehicle, the exact values of which are unknown and therefore have been estimated.

In this case, example vehicle function data describe what the vehicle functions are designed for. They are thus setpoint values or reference values. Advantageously, the state of the energy storage system can thus be estimated by means of a non-computationally intensive analysis step while taking into account the setpoint values and the actual values, i.e. the vehicle function data.

According to a further aspect of the invention, measured electrical properties of the energy storage system and/or a measured electrical behavior of the energy storage system can be taken into account as additional estimation parameters for estimating the state of the energy storage system, wherein the electrical properties and/or the electrical behavior are preferably determined using a battery tester.

This has the advantage that the estimate of the state of the energy storage system is additionally controlled and assessed in a different way, i.e. by means of an independent method, and thus the reliability and accuracy of the estimate are further increased.

As a result, a plausibility check of the result of the estimation of the method according to the invention can also be carried out. As the state of the energy storage system is estimated in two mutually independent ways—more accurately once using the behavior of the vehicle and the other time using directly measured values of the energy storage system—, the meaningfulness of the estimate can be increased. I.e., if both state estimates provide a similar result, the probability is high that the estimation of the state using the behavior of the vehicle is true; on the other hand, if the two state estimates give opposite results, there is a high probability that one estimation method, in particular the estimation of the state using the behavior of the vehicle, is subject to an erroneous estimate. Therefore, advantageously the plausibility of the method according to the invention can be assessed in this case.

According to a further aspect of the invention, information about the manufacturer, date of manufacture and/or the type of the energy storage system can be taken into account as additional estimation parameters for estimating the state of the energy storage system. This also results in an advantageous increase in the accuracy and reliability of the estimate.

According to a further aspect of the invention, the estimation of the state of the energy storage system can be carried out by means of a simulation model, in particular a software-based simulation model.

Simulation models have the advantage that they are inexpensive, can be easily adapted to varying ambient conditions and are universally applicable to different energy storage systems. Moreover, the reliability and the accuracy of the estimate increase. New influencing variables can also be easily taken into account by adapting existing boundary conditions and/or introducing additional boundary conditions.

According to a further aspect of the invention, the acquired information about the energy storage system and/or the acquired information about discharge processes and/or the acquired information about the charging processes can be input values for the simulation model.

Thus, the state of the energy storage system is advantageously estimated using the acquired information about the energy storage system, about discharge processes and/or about charging processes, which reduces the costs for measuring devices and similar.

According to a further aspect of the invention, the energy storage system can be embodied as a secondary battery, in particular an accumulator, and/or as a double-layer capacitor, and/or as a fuel cell or as any combination thereof.

As a result, it is clear that the method according to the invention can be advantageously used universally in many different fields of energy storage and is not limited to one type of energy storage system, wherein the method does not have to undergo any modifications or only has to undergo slight modifications, such as for example adapting the boundary conditions.

Regarding the device for estimating a state of an energy storage system of a vehicle, in particular for estimating the state of a battery system, a double-layer capacitor, a fuel cell or any combination thereof, it is provided that the device is designed for carrying out the method according to the invention that is described above.

According to a further aspect of the invention, the device can further comprise a display unit that is designed to display the estimated state of the energy storage system.

As a result, relevant persons, such as for example the vehicle owner, workshop staff, the customer services, and/or the manufacturer of the energy storage system or the vehicle, can be made aware of the estimated state of the energy storage system and can initiate further steps if necessary. This advantageously provides rapid action and thus increases the reliability of the vehicle. As a result, the process costs are also reduced through simple working processes.

According to a further aspect of the invention, the device can be provided in the vehicle. This has the advantage that the device can continuously estimate the state of the energy storage system. As a result, the reliability of the estimate of the state of the energy storage system, and thus also the reliability of the vehicle, are increased.

Equally however, the device can also be provided spatially and/or physically separately from the vehicle, wherein the device for transferring the vehicle function data is connected to the vehicle by means of an interface to the vehicle. This has the advantage that superfluous or additional components in the vehicle are avoided. As a result, the number of components in the vehicle is reduced, and the costs for high power elements in the vehicle that would be necessary for estimating are reduced.

According to a further aspect of the invention, the device can further comprise an analysis unit that is designed to assess the acquired information about the energy storage system and/or the acquired information about discharge processes of the energy storage system, and/or the acquired information about charging processes of the energy storage system, in particular vehicle function data, while taking into account specified boundary conditions, in particular example vehicle function data.

This has the advantage that the accuracy and thus the reliability of the estimation of the state of the energy storage system are increased.

According to a further aspect of the invention, the device can be used for determination of the state of the energy storage system of the vehicle, and in fact regarding replacement of the energy storage system, maintenance of the energy storage system, and/or a recommendation for the replacement or the maintenance of the energy storage system. As a result, the reliability of the vehicle operation can be advantageously guaranteed for the long term, since replacement or maintenance of the energy storage system can be set in train in a timely manner, or replacement or maintenance of the energy storage system can be advised.

The invention is described in detail below, including regarding further features and advantages, using the description of embodiments with reference to the accompanying drawings.

DETAILED DESCRIPTION

The method and the device for estimating a state of an energy storage system, in particular an aging state of the energy storage system, are described below with reference to the illustrations in FIGS. 1 through 4. Identical or equivalent elements and functions are provided with the same or similar reference characters.

In this context, the term aging state of the energy storage system 320 means a change of any state of the energy storage system 320 relative to the new state of the energy storage system.

Figure 1:
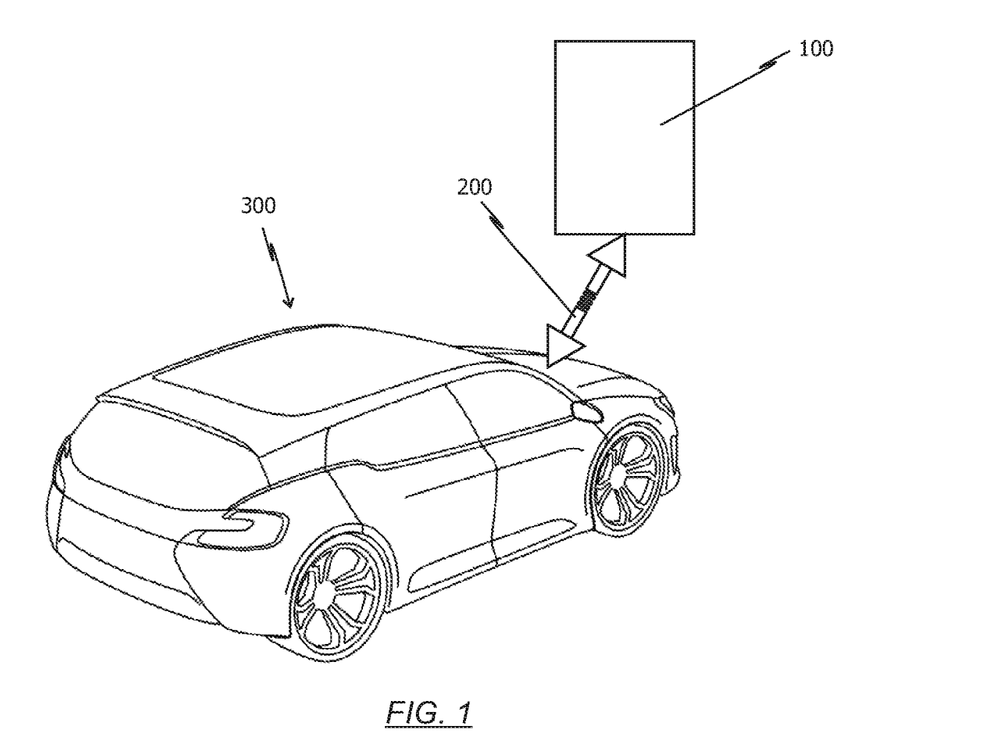
FIG. 1 shows a schematic representation of a vehicle and a device.

FIG. 1 shows a schematic representation of a vehicle 300 and a device 100 for estimating a state of an energy storage system of the vehicle 300. Said vehicle and device 100 are connected for data transmission by means of a link 200.

The vehicle 300 can be an aircraft or a watercraft, a rail vehicle, an all-terrain vehicle, or preferably a road vehicle, wherein a road vehicle can mean a passenger vehicle, a truck, a bus, or a motor home.

The vehicle 300 is driven by a drive unit of the vehicle 300. The drive unit can comprise a combustion engine of the vehicle 300, an electric motor or a combination thereof. A vehicle 300 having at least one combustion engine can moreover have start-stop functionality, and preferably also stop-in-motion functionality.

Start-stop functionality means that the vehicle 300 is capable of switching off the combustion engine of the vehicle 300 at a standstill that is longer than or equal to a specified or specifiable period of time, for example when at a standstill during a red traffic light phase from the specified or specifiable period of time, and can be turned on again by operating a pedal or a switch, for example.

Stop-in-motion functionality means that the vehicle 300 is capable of switching off the combustion engine already if the vehicle 300 is still moving but no pedal has been operated for a specified or specifiable period of time, or otherwise no power has been demanded from the combustion engine. This occurs for example if the vehicle 300 is coasting, i.e. if the vehicle 300 is moving at a constant speed of travel, or if the vehicle 300 is in the roll-out state without gas.

The vehicle 300 comprises an interface 310, by means of which data can be transmitted to the device 100 by means of a data transmission link 200. In this regard refer to FIG. 2.

Figure 2:
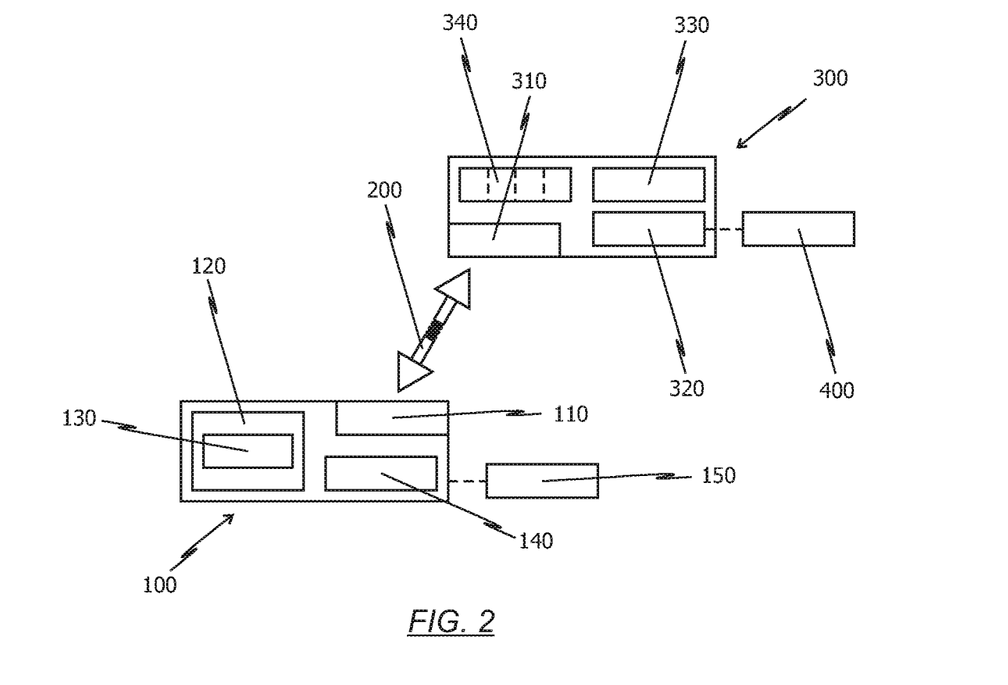
FIG. 2 shows a detailed representation of the vehicle and the device.

Moreover FIG. 2 shows that that the vehicle 300 comprises an energy storage system 320 that is provided for supplying energy to the vehicle 300.

The energy storage system 320 can be embodied as a primary battery. The energy storage system 320 of the vehicle 300 is preferably embodied as a secondary battery, in particular as an accumulator, as a double-layer capacitor, and/or as a fuel cell, or as any combination thereof.

As shown in FIG. 2, the vehicle 300 can comprise a data storage element 330. Acquired information about the energy storage system 320 of the vehicle 300 can be stored on said data storage element.

Acquired information about discharge processes of the energy storage system 320 and/or acquired information about charging processes of the energy storage system 320 can preferably also be stored on the data storage element 330.

Particularly preferably, such information can be acquired over a specified or specifiable period of time.

The specified period of time can for example be a day, a week, two weeks, a month, three months, six months or a year.

Equally, the specifiable or specified period of time can also be defined by means of a sequence of events, and in fact for example by unlocking the vehicle 300, by inserting the key in the ignition lock and/or by switching on the drive unit of the vehicle 300 until switching off the drive unit of the vehicle 300, removing the key from the ignition lock and/or by locking the vehicle 300.

The specifiable period of time can for example also be specified by the time interval between leaving the manufacturing facility and the first estimate, or between two successive estimation processes or can be individually determined by time stamps assigned to the respective information when stored in the data storage element 330.

Said acquired information preferably comprises vehicle function data recorded during operation of the vehicle.

In this case it is to be noted that acquiring the information about the energy storage system 320 of the vehicle 300 and/or acquiring the information about discharge processes and/or acquiring the information about charging processes is carried out without direct or indirect measurement of a capacitance, charge, voltage, and/or current of the energy storage system 320, i.e. that the method according to the invention for estimating the state of the energy storage system 320 is based on the behavior of the vehicle, in particular by recording vehicle function data during operation of the vehicle.

Furthermore, the vehicle 300 can comprise a number of measuring units 340, which continuously determine and store vehicle data.

The vehicle function data can be determined from said vehicle data, or the vehicle function data can correspond to the vehicle data.

The vehicle data can be provided by counting units designed to determine the frequency of a functional change, a diagnostic unit, in particular a diagnostic unit internal to the vehicle, a battery sensor unit, in particular an intelligent battery sensor unit, an electronic control unit, a drive unit of the vehicle 300 and/or similar.

It should be noted that the vehicle data are not produced for the purpose of estimating the state of the energy storage system 320 of the vehicle 300. More accurately, the estimation of the state of the energy storage system 320 can be carried out using data that have been recorded and stored independently thereof.

This gives the advantage that no additional measuring devices are necessary for recording the vehicle function data, but the vehicle function data are determined from data that are recorded during the operation of the vehicle. This reduces the amount of memory in the vehicle 300 and the number of elements and as a result also the costs.

The vehicle data and/or vehicle function data can also be directly read into a database of a manufacturer of the energy storage system 320 or the vehicle 300, customer services and/or a workshop or can be sent to a database of the manufacturer of the energy storage system 320 or the vehicle 300, customer services and/or the workshop. This can for example be carried out by means of a wireless connection via a mobile radio network, such as for example a GSM connection. Advantageously, the number of elements in the vehicle 300 and as a result costs are reduced by means of such a remote data feed, because the amount of memory in the vehicle 300 is kept low.

The vehicle 300 is designed to carry out at least one vehicle function.

The vehicle function data comprise data concerning the fulfilment/non-fulfilment of at least one vehicle function.

In particular, the vehicle function data can comprise data concerning switching off and/or switching on, in particular switching back on, a combustion engine of the vehicle 300, either in a start-stop mode of the combustion engine if the vehicle 300 is at a standstill for a previously specified or specifiable period of time, for example holding during a red traffic light phase for the previously specified or specifiable period of time, or while the vehicle 300 is in motion without for example a pedal having been operated or power being otherwise demanded from the combustion engine of the vehicle 300 for a previously specified or specifiable period of time during a stop-in-motion mode.

Moreover, the vehicle function data can in particular comprise data concerning the operation of at least one functional component or safety component, in particular data concerning the operation of a radiator of a combustion engine of the vehicle 300, internal illumination, external illumination, power steering, power braking, a gearbox, a clutch, preferably an electrical clutch, technical driving safety control systems and/or ride stability control systems, and/or driving dynamics management systems.

Moreover, the vehicle function data can in particular comprise data concerning the operation of at least one comfort component, in particular data concerning the operation of an air conditioning system, heating, in particular seat heating, an audio/video entertainment system and/or a navigation system.

A functional change, in particular an occurrence, an absence or a functional restriction of at least one vehicle function can be concluded from the vehicle function data or a functional change, in particular an occurrence, an absence or a functional restriction of at least one vehicle function is able to be concluded from the vehicle function data.

Moreover, a frequency of a functional change, in particular of an occurrence, of an absence or of a functional restriction of at least one vehicle function during a specified or specifiable period of time can also be concluded from the vehicle function data, or a frequency of a functional change, in particular of an occurrence, of an absence or of a functional restriction of at least one vehicle function during a specified or specifiable period of time is able to be concluded from the vehicle function data.

Moreover, the period of time required for a functional change, in particular an occurrence, an absence or a functional restriction of at least one vehicle function can be concluded from the vehicle function data, or the period of time required for a functional change, in particular an occurrence, an absence or a functional restriction of at least one vehicle function is able to be concluded from the vehicle function data.

In addition, a reason for a functional change, in particular an occurrence, an absence or a functional restriction of at least one vehicle function can be concluded from the vehicle function data, or a reason for a functional change, in particular an occurrence, an absence or a functional restriction of at least one vehicle function is able to be concluded from the vehicle function data.

In this case, the reason for a functional change, in particular an occurrence, an absence or a functional restriction of the at least one vehicle function can comprise a battery property and/or battery power and/or a battery voltage and/or a battery current and/or a time variation of a battery property, battery power, battery voltage and/or battery current and/or a model for estimating the battery property and/or the battery power.

The vehicle 300 can be embodied as a vehicle with a combustion engine, as an electric vehicle, or as a hybrid vehicle. In this context, it should be noted that for estimating the state of the energy storage system 320 of the vehicle 300 the estimate can be carried out independently of the presence of a combustion engine, i.e. for example start-stop functionality, and in fact by considering data of at least one functional component or safety component and/or by considering data of at least one comfort component.

The vehicle function data are transmitted to the device 100 for the estimation. This is indicated in FIGS. 1 and 2 by the arrow 200.

Even if this is not shown explicitly in the figures, transmission of the vehicle function data can also be carried out from the database to the device 100. Equally, it is conceivable that the database is provided as part of the device 100.

It should be noted that the vehicle function data at the point in time at which the vehicle function data for the estimation are transmitted, comprise information about past events, i.e. that the vehicle function data at the point in time of the estimation are historic vehicle function data.

The data transmission link 200 may be established in wired or wireless form. The data can for example be transferred via the Internet, a LAN connection, a WAN connection or a USB connection. The data can for example be transferred via the Internet, a LAN connection, a WAN connection or a USB connection. Equally however, it is also conceivable that the vehicle function data are transmitted via a WLAN connection, a Bluetooth connection, a Near-Field Communication connection, a GSM connection or a UMTS connection.

The data transmission can be carried out continuously. Preferably however, the data transmission link 200 is only established at certain points in time.

This can particularly preferably be carried out during a test in a workshop.

The device 100 for estimating the state of the energy storage system 320 of the vehicle 300 can be provided in the vehicle 300. Preferably however, this is provided spatially and/or structurally separately from the vehicle 300. This advantageously reduces the number of components in the vehicle 300 and the wiring costs and hence the assembly costs.

In addition, as a result of the estimate being carried out separately from the vehicle 300, computationally intensive processes, such as carrying out the estimate, are provided separately from the vehicle 300, which reduces the costs that would arise for higher quality vehicle components.

The device 100 is designed to estimate the state of the energy storage system 320 of the vehicle 300.

Preferably, the device 100 is designed to estimate the state of the energy storage system 320 of the vehicle 300 based on the analysis of the acquired information about the energy storage system 320 while taking into account specified boundary conditions.

Particularly preferably, the device 100 is designed to estimate the state of the energy storage system 320 of the vehicle 300 based on a comparison of the acquired information about the energy storage system 320 with the specified boundary conditions, in particular based on a comparison of vehicle function data with example vehicle function data.

In one development, the device 100 is designed to be able to estimate the state of the energy storage system 320 of the vehicle 300 using acquired information about discharge processes of the energy storage system 320 of the vehicle 300.

Also, the device 100 is designed to be able to estimate the state of the energy storage system 320 of the vehicle 300 using acquired information about charging processes of the energy storage system 320 of the vehicle 300.

In the following, "acquired information" shall mean the acquired information about the energy storage system 320 and/or the acquired information about discharge processes of the energy storage system 320 and/or the acquired information about charging processes of the energy storage system 320.

For this the device 100 comprises hardware components and software components that can carry out the estimation of the state of the energy storage system 320. Moreover, the device 100 preferably comprises a processor.

As shown in FIG. 2, a receiving unit 110 of the device 100 can receive the recorded information of the energy storage system 320 of the vehicle 300 for this, in particular vehicle function data, from the vehicle 300 and can forward said data to an estimating unit 120. The estimating unit 120 is designed to estimate the state of the energy storage system 320.

FIG. 2 shows moreover that the device 100 can further comprise an analysis unit 130. The analysis unit 130 is embodied to analyze the acquired information, in particular vehicle function data, while taking into account specified boundary conditions, in particular previously specified or specifiable vehicle function data and/or example vehicle data.

Preferably, for the analysis the acquired information, in particular vehicle function data, is compared with the specified boundary conditions, in particular the previously specified or specifiable vehicle function data and/or the example vehicle data.

Preferably, the analysis unit 130 is provided as an element of the estimating unit 120, as shown in FIG. 2.

Even if this is not shown in the figures, it is however also conceivable that the analysis unit 130 is provided as an element of the device 100 and communicates with the estimating unit 120 via a data connection.

In one embodiment, the estimating unit 120 comprises a simulation model, in particular a software-based simulation model. In this case, the acquired information is preferably input values for the simulation model.

The specified boundary conditions can be stored in a memory unit 140 of the device 100. The specified boundary conditions specify a benchmark for at least one vehicle function in relation to an operating time of the vehicle 300, for which the energy storage system 320 is designed. The boundary conditions are thus setpoint values or reference values for the respective vehicle function data, and in fact in relation to the operating time of the vehicle. For example, the specified boundary conditions can contain information about how often a vehicle function is to be carried out or can be carried out or is not to be carried out or cannot be carried out within a specified or specifiable period of time.

The specified boundary conditions can be contained in lookup tables that are provided by the manufacturer, customer services and/or the workshops. Said specified boundary conditions are referred to below as specified, predetermined boundary conditions.

Moreover, in the course of time the specified boundary conditions can be added to and adjusted with empirical data, i.e. with real values, wherein the empirical data are preferably provided by workshops and/or by the manufacturer/and or customer services. In particular, such empirical data are obtained by in-depth consideration of the relationship between the behavior of the vehicle, in particular the fulfilment/non-fulfilment of at least one vehicle function, i.e. the vehicle function data, and the state of the energy storage system 320 of many similar vehicles 300 with identical or similar energy storage systems 320. Such predetermined values are referred to below as learnt, predetermined boundary conditions. This markedly increases the reliability and accuracy of the estimate of the state of the energy storage system 320.

The vehicle function data of at least one vehicle function can be analyzed while taking into account the learnt or specified, predetermined boundary conditions of the corresponding vehicle function. This is preferably carried out in the analysis unit 130, as shown in FIG. 2. It is however also conceivable that the estimating unit 120 is also designed for analyzing the vehicle function data while taking into account the learnt or specified, predetermined boundary conditions.

The analysis is preferably carried out by comparing the vehicle function data of at least one vehicle function with the respective learnt or specified, predetermined boundary conditions.

The vehicle function data can thus be used to detect a deviation from a normal vehicle function behavior and to estimate the expected behavior of the energy storage system 320.

Furthermore, output information can be generated based on the vehicle function data and then preferably provided in the form of a data record, a graphical representation and/or a graphical user interface. This is preferably carried out by means of an output unit 150, as indicated in FIG. 2.

The output information can furthermore be used to inform a vehicle owner for example as to whether the battery is the trigger for the behavior of the vehicle deviating from the expected behavior. It is however also conceivable that the output information can be used to inform a vehicle owner for example as to whether a battery replacement would reduce the deviations from the expected behavior of the vehicle.

For this the output information can be an estimate of the state of the energy storage system 320.

The output unit 150 can be disposed in the device 100. Furthermore however, the output unit 150 can equally well be provided in the vehicle 300. Preferably however, the output unit 150 is provided separately from the device 100 and separately from the vehicle 300, for example in a workshop. Said embodiment is indicated in FIG. 2.

The output unit 150 can comprise a cell phone, in particular a smartphone, a PC, in particular a tablet PC and/or a laptop, a display in the vehicle, a graphical user interface, and/or a diagnostic device, in particular a workshop diagnostic device. This advantageously ensures that the result of the estimation is provided either to the vehicle owner, a customer service employee, the manufacturer and/or workshop staff.

In a preferred embodiment, the device 100 is provided separately from the vehicle 300 in a workshop. In this case, the vehicle function data are transmitted to the device 100, for example during an investigation of the vehicle 300. The estimation of the state of the energy storage system 320 of the vehicle 300 is carried out in the device 100. The result is displayed to the workshop staff, who can inform the vehicle owner about the state of the energy storage system 320 in a further step and can initiate an order for a new energy storage system 320 if applicable.

Figure 3:
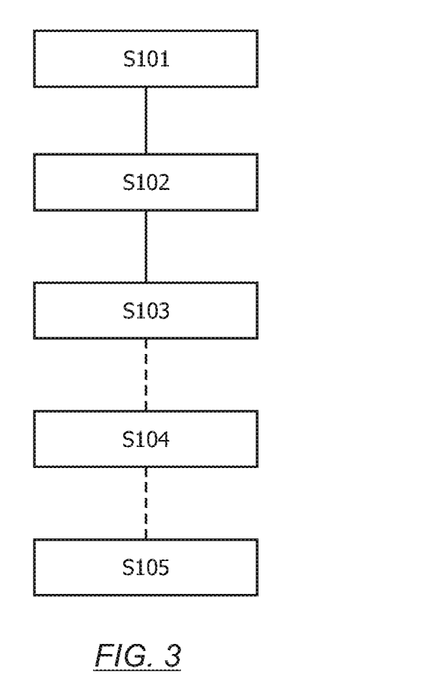
FIG. 3 shows a first flow chart of the method according to the invention for estimating the state of the energy storage system.

In FIG. 3, an embodiment of the method according to the invention is described.

In this case, in the step S101 information about the energy storage system 320 of the vehicle 300 is acquired. The acquisition of the information about the energy storage system 320 can in particular be carried out by recording vehicle function data In this case, the vehicle function data can comprise on the one hand information about an actual functional change, in particular an occurrence, an absence or a functional restriction of at least one vehicle function, and/or on the other hand can comprise information such as a frequency of a functional change, in particular of an occurrence, of an absence or of a functional restriction of the at least one vehicle function during a previously specified or specifiable period of time, and/or a period of time required for a functional change, in particular an occurrence, an absence or a functional restriction of the at least one vehicle function, and/or a reason for a functional change, in particular an occurrence, an absence or a functional restriction of the at least one vehicle function.

In a preferred embodiment, the vehicle function data comprise information about the frequency of the functional change, in particular of the occurrence, of the absence or of the functional restriction of at least one vehicle function over a specified or specifiable period of time and the reason for the absence of at least one vehicle function.

The specified period of time can comprise a period of time of a day, three days, a week, two weeks, a month, three months, six months or a year, and the specifiable period of time can be specified by the time interval between leaving the manufacturing facility and the first estimation, or between two successive estimation processes or can be individually determined by a time stamp that is assigned to the respective functional changes when storing in the data storage element 330.

Equally, the specifiable or specified period of time can also be defined by means of a sequence of events, and in fact for example by unlocking the vehicle 300, inserting the key into the ignition lock and/or switching on the drive unit of the vehicle 300 until switching off the drive unit of the vehicle 300, extracting the key from the ignition lock and/or locking the vehicle 300.

After this, in the step S102 the analysis of the recorded information about the energy storage system 320 is carried out, in particular of the vehicle function data, with specified boundary conditions, in particular previously specified or specifiable vehicle function data and/or example vehicle function data, as shown in FIG. 3.

The specified boundary conditions contain information about what the energy storage system 320 is designed for.

In the preferred embodiment, the specified boundary conditions comprise in particular the previously specified or specifiable vehicle function data and/or the example vehicle function data, for example information about how often which vehicle function has fulfilled/not fulfilled the corresponding vehicle function during how long a period of time. The vehicle function data comprise in turn information about how often which vehicle function has actually fulfilled/not fulfilled the corresponding vehicle function during how long a period of time, in particular for what reason.

Then the estimation of the state of the energy storage system 320 of the vehicle 300 is carried out in the step S103.

In particular, the estimation of the state of the energy storage system 320 is carried out based on the analysis (S102) of the acquired information about the energy storage system 320 of the vehicle 300 with the specified boundary conditions.

Particularly preferably, the estimation of the state of the energy storage system 320 is carried out based on a comparison of the acquired information about the energy storage system 320 with the specified boundary conditions.

The dashed lines indicate further possible steps; namely the step S104 in which output information about the energy storage system 320 of the vehicle 300 is generated based on the acquired information about the energy storage system 320, in particular the vehicle function data. Furthermore, the generated output information can be provided in a step S105 in the form of a data record, a graphical representation and/or a graphical user interface.

Figure 4:
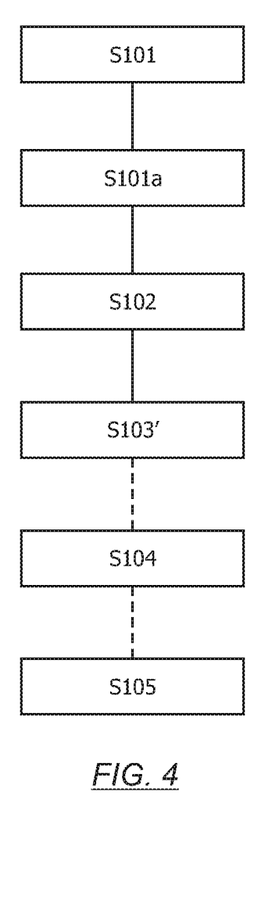
FIG. 4 shows a second flow chart of the method according to the invention.

FIG. 4 shows a further flow chart of the method, in which first information about the energy storage system 320 (S101), information about discharge processes (S101') and information about charging processes (S101") of the energy storage system 320 of the vehicle 300 is acquired.

Then the recorded information is analyzed (S102), preferably compared, while taking into account specified boundary conditions, and then the state of the energy storage system 320 of the vehicle 300 is estimated, in particular based on the analysis, preferably the comparison, of the acquired information about the energy storage system 320, the acquired information about the discharge processes and the acquired information about the charging processes while taking into account the specified boundary conditions, which corresponds to the step S103'.

Even if this is not expressly shown in the figures, the state of the energy storage system 320 can also be estimated based on the acquired information about the discharge processes or based on the acquired information about the charging processes or based on the acquired information about the discharge processes and charging processes.

The dashed lines in FIG. 4 again indicate further possible steps; namely the step S104 in which output information about the energy storage system 320 of the vehicle 300 is generated based on the acquired information, in particular the vehicle function data. Furthermore, the generated output information can also be provided in a step S105 in the form of a data record, a graphical representation, and/or a graphical user interface.

The step S102 can be carried out in an analysis unit 130 of the device 100 or the estimating unit 120 of the device 100.

The vehicle function data can thus be used to detect a deviation from a normal vehicle function behavior and to estimate the expected behavior of the energy storage system 320.

The output information can furthermore be used to inform a vehicle owner for example as to whether the battery is the trigger for the behavior of the vehicle deviating from the expected behavior. It is however also conceivable that the output information can be used to inform a vehicle owner for example as to whether a battery replacement would reduce the deviations from the expected behavior of the vehicle.

In one development, the generated output information can be displayed on an output unit 150.

The output unit 150 can be present in the vehicle 300, for example as a display, in the device 100, or can be provided separately from the vehicle 300 and device 100. Preferably, the output unit 150 is provided to be seen by a worker in a workshop and/or in customer services.

The output unit 150 can be a cell phone, in particular a smartphone, a PC, in particular a tablet PC and/or a laptop, a display in the vehicle, and/or a graphical user interface, and/or a diagnostic device, in particular a workshop diagnostic device.

In a preferred embodiment, output information can be generated that suggests the replacement of the energy storage system 320 if a significant reduction in the fulfillment/non-fulfillment of at least one vehicle function is determined. For example, if at least one vehicle function has only been fulfilled half as often or less than it should have been fulfilled. Furthermore, output information can be generated that only suggests replacement of the energy storage system 320 if at least one vehicle function has been fulfilled in only a third or less of the cases in which it should have been fulfilled.

Particularly preferably, said output information shall be generated if the energy storage system 320 has been determined as the reason or cause of the non-fulfillment of the at least one vehicle function.

In a development of said preferred embodiment, it is conceivable that output information is generated that suggests the replacement of the energy storage system 320 within six months if a significant reduction in the fulfillment/non-fulfillment of at least one vehicle function is determined. For example, if at least one vehicle function has been fulfilled only half as often or less than it should have been fulfilled.

Furthermore, it is also conceivable that output information is generated that suggests immediate replacement of the energy storage system 320 once a significant reduction in the fulfillment/non-fulfillment of at least one vehicle function is determined For example, if at least one vehicle function has only been fulfilled in a third or less of the cases than it should have been fulfilled.

Moreover, current measured values of the energy storage system 320 can definitely be used as additional estimation parameters for estimating the state of the energy storage system 320. For this, the electrical properties of the battery and/or the electrical behavior the energy storage system are measured. This is preferably carried out with a battery tester 400, as indicated in FIG. 2.

In this case, the battery tester 400 can be provided within the vehicle (not shown in the figures) or can only be connected to the energy storage system 320 for measurement.

The use of the current measured values of the energy storage system 320 of the vehicle 300 increases the reliability and the meaningfulness of the output information, because the estimation of the state of the energy storage system 320 is achieved in two mutually independent ways. Thus, the estimation of the state based on the directly measured values can form a plausibility check of the estimation of the behavior of the vehicle.

Likewise, for estimating the state of the energy storage system 320, information about the manufacturer, about the date of manufacture and/or about the type of the energy storage system 320 can be taken into account as additional estimation parameters.

In order to increase the reliability and accuracy of the estimate still further, the ambient temperature, the time of year and geographical information can also be considered, because the behavior and the service life of an energy storage system 320 for example depend strongly on where, at which ambient temperatures and in which climate it is used.

Also, information about the operation of the vehicle contributes to increasing the estimation accuracy. Thus, the (average) speed, the (average) distance of travel per day/week/month/year, the (average) distance of travel per journey, the (average) period of time of down times and parking times and/or the period of time between investigations in the workshop are taken into account.

For example, an energy storage system 320 of a vehicle 300 that is operated in a hot and humid climate with mainly short trips and long downtimes behaves differently from an energy storage system 320' of a vehicle 300' that is operated in a cold and dry climate with mainly long trips and short downtimes.

In a preferred embodiment, the device 100 can be used for the determination of the state of an energy storage system 320 of a vehicle 300 in order to suggest replacement of the energy storage system 320, maintenance of the energy storage system 320 and/or a recommendation regarding the replacement or the maintenance of the energy storage system 320.

At this point it should be noted that all the parts described above, viewed on their own and in any combination, in particular the details shown in the drawings, are claimed as essential to the invention. Amendments thereof are familiar to the person skilled in the art.

The invention claimed is:

1. A method of estimating a state of an energy storage system of a vehicle, wherein the method comprises:
   acquiring information about the energy storage system;
   analyzing the acquired information while taking into account specified boundary conditions; and
   estimating the state of the energy storage system without using directly or indirectly measured values of a capacitance, charge, voltage, current of the energy storage system or any combination thereof,
   wherein vehicle function data is recorded for acquiring the information about the energy storage system,
   wherein a function change comprising an occurrence, an absence, or a function restriction of at least one vehicle function is concluded or can be concluded from the vehicle function data, and
   wherein the vehicle function data comprise:

data concerning a fulfilment/non-fulfilment of at least one vehicle function including data concerning at least one functional component or safety component, in particular data concerning operation of a radiator of an engine of the vehicle, internal lighting, external lighting, power steering, power braking, a gearbox, a clutch, an electric clutch, technical driving safety systems, ride stability control systems, or driving dynamics management-systems, or any combination thereof;

data concerning switching off or switching on a combustion engine of the vehicle in a start-stop mode of the combustion engine;

data concerning the fulfilment/non-fulfilment of at least one vehicle function including data concerning operation of at least one comfort component, in particular data concerning operation of an air conditioning system, heating, an audio/video entertainment system, a navigation system, or any combination thereof; or any combination thereof.

2. The method of claim 1, comprising acquiring information about discharge processes of the energy storage system.

3. The method of claim 1, comprising acquiring information about charging processes of the energy storage system.

4. The method of claim 1, wherein the vehicle function data is recorded for acquiring information about discharge processes, or for acquiring information about charging processes, or for any combination thereof.

5. The method of claim 4, comprising:
generating output information based on the vehicle function data; and
providing the generated output information, preferably in the form of a data record, a graphical representation, or a graphical user interface or any combination thereof.

6. The method of claim 5, wherein the output information comprises an estimate of the state of the energy storage system.

7. The method of claim 1, wherein a frequency of the function change during a specified or specifiable period of time is concluded or can be concluded from the vehicle function data.

8. The method of claim 4, wherein a period of time required for a function change of at least one vehicle function is concluded or can be concluded from the vehicle function data, wherein the function change comprises an occurrence, an absence or a function restriction.

9. The method of claim 4, wherein a reason for, or a cause of a function change comprising an occurrence, an absence or a function restriction of at least one vehicle function is concluded or can be concluded from the vehicle function data.

10. The method of claim 4, wherein the specified boundary conditions comprise predetermined or definable vehicle function data, or example vehicle function data, or any combination thereof.

11. The method of claim 1, wherein estimating a state of the energy storage system comprises taking into account, as an additional parameter, information about the manufacturer, the data of manufacture, or the type of the energy storage system, or any combination thereof.

12. The method of claim 1, wherein estimating the state of the energy storage system is carried out using a software-based simulation model.

13. The method of claim 12, wherein the acquired information about the energy storage system, the acquired information about discharge processes, or the acquired information about charging processes, or any combination thereof, are input values for the software-based simulation model.

14. The method of claim 1, wherein the energy storage system is embodied as an accumulator, as a double-layer capacitor, or as a fuel cell, or as any combination thereof.

* * * * *

UNITED STATES PATENT AND TRADEMARK OFFICE
CERTIFICATE OF CORRECTION

PATENT NO. : 11,309,591 B2
APPLICATION NO. : 16/093952
DATED : April 19, 2022
INVENTOR(S) : Ingo Koch et al.

Page 1 of 1

It is certified that error appears in the above-identified patent and that said Letters Patent is hereby corrected as shown below:

On the Title Page

1. In Item (73), under "Assignees", in Column 1, Line 1, delete "Ciarlos" and insert -- Clarios --, therefor.

2. In Item (73), under "Assignees", in Column 1, Line 3, delete "Hannover" and insert -- Stuttgart --, therefor.

In the Specification

3. In Column 2, Line 64, delete "syst." and insert -- system. --, therefor.

4. In Column 7, Line 19, delete "regarding further" and insert -- further --, therefor.

5. In Column 8, Lines 12, delete "that that the" and insert -- that the --, therefor.

6. In Column 11, Lines 4, delete "structurally separately" and insert -- structurally separate --, therefor.

7. In Column 12, Lines 30-31, delete "manufacturer/and or" and insert -- manufacturer and/or --, therefor.

8. In Column 13, Line 35, delete "data" and insert -- data. --, therefor.

9. In Column 15, Line 58, delete "determined" and insert -- determined. --, therefor.

10. In Column 15, Line 65, delete "the energy" and insert -- of the energy --, therefor.

Signed and Sealed this
Ninth Day of April, 2024

Katherine Kelly Vidal
*Director of the United States Patent and Trademark Office*